(12) United States Patent
Yasuda

(10) Patent No.: US 10,440,326 B2
(45) Date of Patent: Oct. 8, 2019

(54) VIDEO CONFERENCE SYSTEM AND VIDEO CONFERENCE METHOD

(71) Applicant: NEC Platforms, Ltd., Kawasaki-shi, Kanagawa (JP)

(72) Inventor: Masayuki Yasuda, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/300,694

(22) PCT Filed: Jun. 16, 2017

(86) PCT No.: PCT/JP2017/022265
§ 371 (c)(1),
(2) Date: Nov. 12, 2018

(87) PCT Pub. No.: WO2018/012191
PCT Pub. Date: Jan. 18, 2018

(65) Prior Publication Data
US 2019/0158786 A1 May 23, 2019

(30) Foreign Application Priority Data
Jul. 12, 2016 (JP) .................................. 2016-137332

(51) Int. Cl.
*H04N 7/14* (2006.01)
*H04N 7/15* (2006.01)
*H04L 29/06* (2006.01)

(52) U.S. Cl.
CPC ........... *H04N 7/15* (2013.01); *H04L 65/1063* (2013.01); *H04L 65/608* (2013.01); *H04L 65/80* (2013.01); *H04N 7/147* (2013.01)

(58) Field of Classification Search
CPC ....................................................... H04N 7/14
See application file for complete search history.

(56) References Cited

U.S. PATENT DOCUMENTS 8,125,932 B2 2/2012 Yang
2010/0002069 A1* 1/2010 Eleftheriadis .......... H04N 7/152
348/14.08

FOREIGN PATENT DOCUMENTS

JP 2006-094128 A 4/2006
JP 2007-318556 A 12/2007
(Continued)

OTHER PUBLICATIONS

WebRTC, [online], [Searched on Mar. 29, 2016], Internet <URL:http://www.webrtc.org/>.
(Continued)

*Primary Examiner* — Olisa Anwah
(74) *Attorney, Agent, or Firm* — Sughrue Mion, PLLC

(57) ABSTRACT

An application server determines a screen layout according to the number of participants in a video conference and a media transmission and reception flow going through all devices used by the participants, and transmits the screen layout and the media transmission and reception flow to each of the plurality of devices, and at least one of the plurality of devices transmits a screen image where an image generated by itself is superimposed in an upper layer of a base layer, which is an image received from a device located previous to itself in the media transmission and reception flow, according to the screen layout by using the Web application received from the application server, to a device located subsequent to itself. This achieves media communication that is two-way and allows connection of many devices only by peer-to-peer communication between devices without through a server that relays media communication.

4 Claims, 13 Drawing Sheets

(56) References Cited

FOREIGN PATENT DOCUMENTS

| JP | 2011-035833 A | 2/2011 |
|----|---------------|--------|
| JP | 2014-011704 A | 1/2014 |
| WO | 2011-010563 A1 | 1/2011 |

OTHER PUBLICATIONS

International Search Report of PCT/JP2017/022265 dated Jul. 18, 2017 [PCT/ISA/210].
Communication dated May 23, 2019 from European Patent Office in counterpart EP Application No. 17827322.3.

* cited by examiner

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | | | good | | |
| DEVICE 400-2 | 400-3 | good | 400-1 | | | | good | |
| DEVICE 400-3 | 400-4 | good | 400-2 | | | | | good |
| DEVICE 400-4 | 400-1 | good | 400-3 | | | | | good |

(B)

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | | | good |
| DEVICE 400-2 | 400-3 | good | 400-1 | good | good | good | | |
| DEVICE 400-3 | 400-4 | good | 400-2 | good | | good | good | |
| DEVICE 400-4 | 400-1 | good | 400-3 | good | | | good | good |

(C)

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | | good | good |
| DEVICE 400-2 | 400-3 | good | 400-1 | good | good | good | | good |
| DEVICE 400-3 | 400-4 | good | 400-2 | good | good | good | good | |
| DEVICE 400-4 | 400-1 | good | 400-3 | good | | good | good | good |

(D)

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | good | good | good |
| DEVICE 400-2 | 400-3 | good | 400-1 | good | good | good | good | good |
| DEVICE 400-3 | 400-4 | good | 400-2 | good | good | good | good | good |
| DEVICE 400-4 | 400-1 | good | 400-3 | good | good | good | good | good |

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | bad | bad | good |
| DEVICE 400-2 | 400-3 | bad | 400-1 | good | good | good | bad | good |
| DEVICE 400-3 | 400-4 | bad | 400-2 | bad | bad | bad | bad | bad |
| DEVICE 400-4 | 400-1 | good | 400-3 | bad | bad | bad | bad | good |

(B)

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | bad | bad | good |
| DEVICE 400-2 | 400-4 | good | 400-1 | good | good | good | bad | good |
| DEVICE 400-3 | 400-4 | bad | 400-4 | bad | bad | bad | bad | bad |
| DEVICE 400-4 | 400-1 | good | 400-2 | good | good | good | bad | good |

(C)

| | DESTINATION | TRANSMISSION QUALITY | BASE | RECEPTION QUALITY | IMAGE1 | IMAGE2 | IMAGE3 | IMAGE4 |
|---|---|---|---|---|---|---|---|---|
| DEVICE 400-1 | 400-2 | good | 400-4 | good | good | good | bad | good |
| DEVICE 400-2 | 400-4 | good | 400-1 | good | good | good | bad | good |
| DEVICE 400-3 | 400-4 | bad | 400-4 | bad | bad | bad | bad | bad |
| DEVICE 400-4 | 400-1 | good | 400-2 | good | good | good | bad | good |

VIDEO CONFERENCE SYSTEM AND VIDEO CONFERENCE METHOD

CROSS REFERENCE TO RELATED APPLICATIONS

This application is a National Stage of International Application No. PCT/JP2017/022265, filed Jun. 16, 2017, claiming priority based on Japanese Patent Application No. 2016-137332, filed Jul. 12, 2016, the contents of all of which are incorporated herein by reference in their entirety.

TECHNICAL FIELD

The present invention relates to a video conference system, an application server, a device, a video conference method, and a video conference program. Particularly, the present invention relates to a video conference system, an application server, a device, a video conference method, and a non-transitory computer readable medium storing a video conference program using peer-to-peer relay communication.

BACKGROUND ART

Web Real-Time Communication (WebRTC), which has become increasingly standardized, has enabled easier provision of a set of real-time media features as disclosed in Non Patent Literature 1 on browser applications and native applications including WebRTC library. By use of WebRTC and HyperText Markup Language 5 (HTML5), a device can directly establish a media flow with another device, and real-time interactive television, media in audio and text format, and/or data exchange have been achieved and become more widely used.

CITATION LIST

Patent Literature

PTL1: International Patent Publication No. WO2011/010563

Non Patent Literature

NPL1: WebRTC, [online], [Searched on Mar. 29, 2016], Internet <URL: http://www.webrtc.org/>

SUMMARY OF INVENTION

Technical Problem

Because media communication with WebRTC is performed peer-to-peer between devices, when communicating with a plurality of persons, such as in a video conference which many people participate in, the network topology is a full mesh, and more device processing resources and a larger communication bandwidth are required as the number of participants increases.

To solve this issue, the network topology can be designed as star with MCU (Multi Control Unit) or SFU (Selective is a Forwarding Unit) to thereby reduce the device processing resources or the communication bandwidth. However, in such a star network communication, a server that exercises integrated control over or relays media communication needs to have high processing capabilities and large communication bandwidth, and thus high introduction costs are required.

On the other hand, the invention disclosed in Patent Literature 1 has been proposed as a method of implementing a video conference with many participants by peer-to-peer technology. According to the technique disclosed therein, a host restricts those who transmit and receive an image with each other and thereby achieves reduction of the communication bandwidth; however, complete two-way transmission is not achieved.

In view of the foregoing, an object of the present invention is to provide a system, a device, a method, and a program that achieve media communication that is two way and allows connection of many devices only by peer-to-peer communication between devices without through a server that relays media communication.

Solution to Problem

According to a first aspect of the present invention, there is provided a video conference system including an application server and a plurality of devices configured to be connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices, and at least one device of the plurality of devices transmits a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow.

According to a second aspect of the present invention, there is provided an application server used in a video conference system including the application server and a plurality of devices that are connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices.

According to a third aspect of the present invention, there is provided a device used in a video conference system including an application server and a plurality of devices that are connected to the application server through a communication network and receive a Web application from the application server, wherein when the application server determines a screen layout according to the number of participants in a video conference and a media transmission and reception flow going through all devices used by the participants and transmits the screen layout and the media transmission and reception flow to each of the plurality of devices, the device transmits a screen image where an image generated by the device is superimposed in an upper layer of a base layer, the base layer being an image received from a device located previous to the device in the media transmission and reception flow, according to the screen layout received from the application server by using the Web application, to a device located subsequent to the device in the media transmission and reception flow.

According to a fourth aspect of the present invention, there is provided a video conference method used in a video conference system including an application server and a plurality of devices that are connected to the application server through a communication network and receive a Web application from the application server, the method including determining, by the application server, a screen layout according to the number of participants in a video conference and a media transmission and reception flow going through all devices used by the participants, and transmitting the screen layout and the media transmission and reception flow to each of the plurality of devices, and transmitting, by at least one device of the plurality of devices, a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow.

According to a fifth aspect of the present invention, there is provided a video conference program causing a computer to function as an application server used in a video conference system including the application server and a plurality of devices that are connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices.

Advantageous Effects of Invention

According to the present invention, it is possible to achieve decentralization of the communication bandwidth and reduction of the processing load in a video conference system by peer-to-peer relay communication.

BRIEF DESCRIPTION OF DRAWINGS

FIG. 7 is a view showing transition of information of a device management array in the video conference system according to the embodiment of the present invention.

FIG. 11 is a view showing transition of information of a device management array in the video conference system according to the embodiment of the present invention.

DESCRIPTION OF EMBODIMENTS

An embodiment of the present invention is described hereinafter in detail with reference to FIGS. 1 to 11.

The present invention is described hereinafter with reference to an example of using an application server. In the case of holding a video conference with four persons, each of the four persons starts up a browser by using a device having an image input and accesses an application server. The application server transmits a Web application as content to each device.

<Configuration of Invention>

Figure 1:
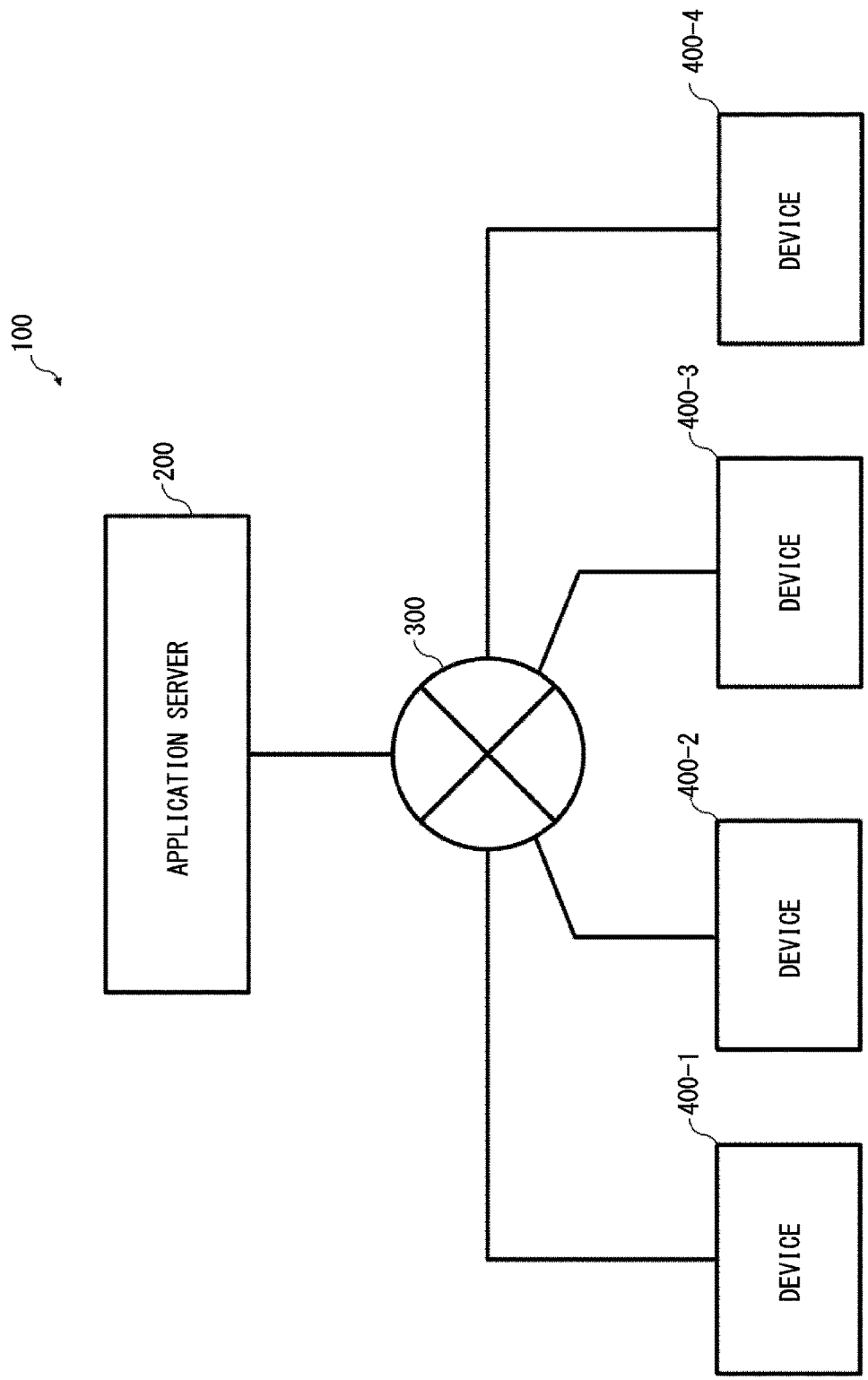
FIG. 1 is a view showing a configuration example of a video conference system according to an embodiment of the present invention.

Referring to FIG. 1, a video conference system 100 according to the present invention includes an application server 200, and four devices 400-1 to 400-4 (which are collectively referred to also as "devices 400") that are connected to the application server 200 through a communication network 300, each of the devices 400 including an image input unit, an image output unit, and a browser that supports a WebRTC function. The application server 200 is a server in which a Web server function, signaling server function and device control function operate, and its detailed configuration is described later with reference to FIG. 2. Further, although it is assumed in this description that the number of devices is four, this is merely an example, and the number of devices to which this embodiment is applicable is not limited. Further, the application server 200, the devices 400 and the communication network 300 are connected through a LAN (Local Area Network) cable.

Figure 2:
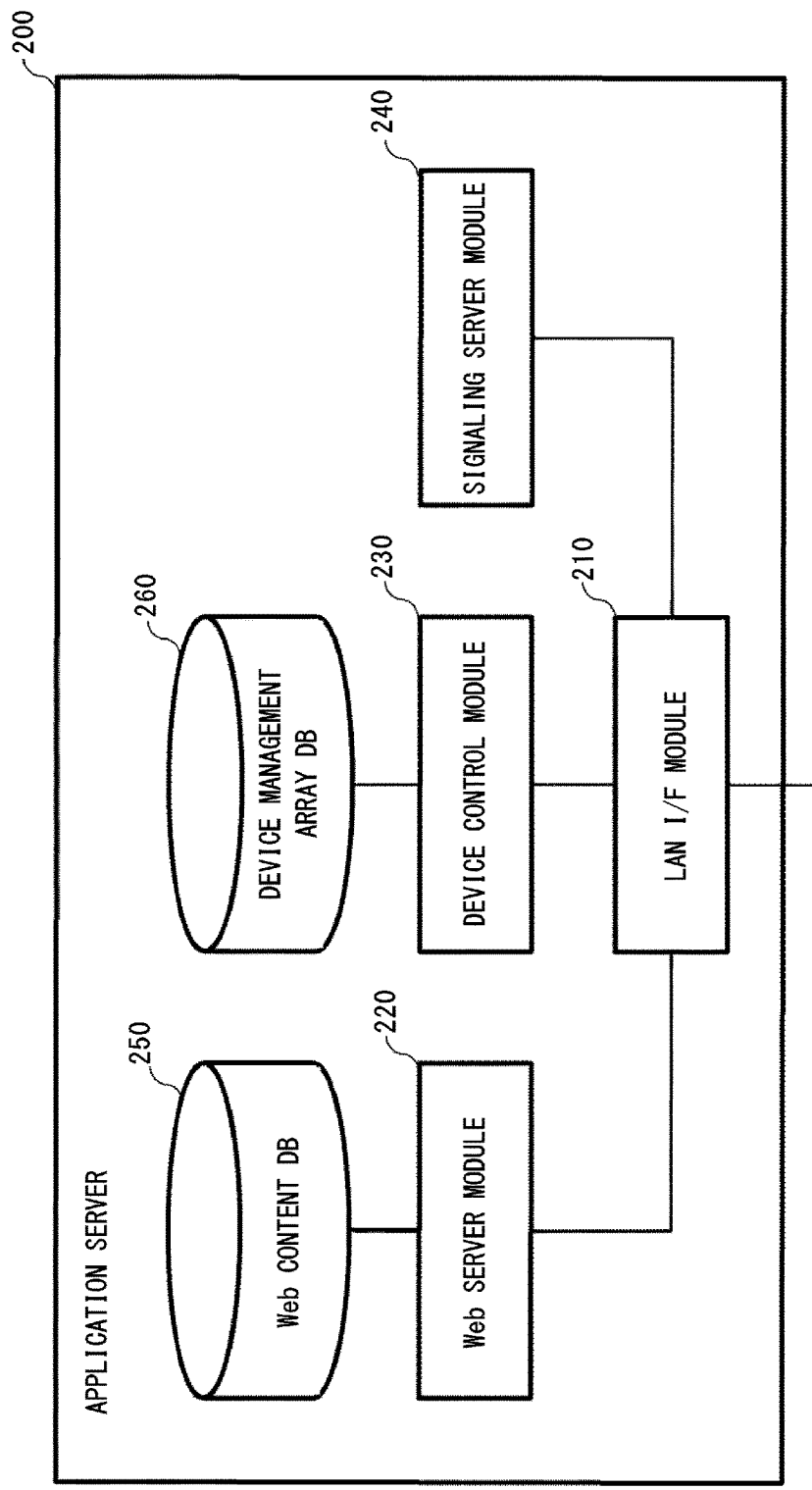
FIG. 2 is a view showing a configuration example of an application server according to the embodiment of the present invention.

Referring to FIG. 2, the application server 200 includes a LAN I/F module 210, a Web server module 220, a device control module 230, a signaling server module 240, a Web content database 250, and a device management array database 260.

The LAN I/F module 210 is connected to the Web server module 220, the device control module 230 and the signaling server module 240, and it has the function of receiving a signal from a LAN cable and transmitting it to each of the above modules. Further, the LAN I/F module 210 has the function of sending a message, which is received from each of the above modules and whose destination is the device 400 or the communication network 300, to the LAN cable. Note that the LAN I/F module 210 corresponds to a receiving means and a transmitting means of the application server 200.

The Web server module 220 is placed between the LAN I/F module 210 and the Web content database 250. The Web server module 220 receives a message sent from the device 400 or the communication network 300 through the LAN I/F module 210 and analyzes the received message. Based on a result of the analysis, the Web server module 220 sends Web content stored in the Web content database 250 back to them.

The device control module 230 is placed between the LAN I/F module 210 and the device management array database 260. The device control module 230 receives a message sent from the device 400 or the communication network 300 through the LAN I/F module and analyzes the received message. Based on a result of the analysis, the device control module 230 registers the state of each device into the device management array database 260 or updates the data stored in the device management array database 260, and then transmits a device control message to the device 400. A specific example of the control message is "transmit an image to the device 400-1 according to the screen layout" or the like.

The signaling server module 240 is connected to the LAN I/F module 210, and transfers a signaling message received from the devices 400-1 to 400-4 to another device. The content of the received signaling message may be analyzed and rewritten, or the received signaling message may be transferred without any change. Note that "signaling" is mainly preprocessing required for initiating peer-to-peer communication.

Figure 3:
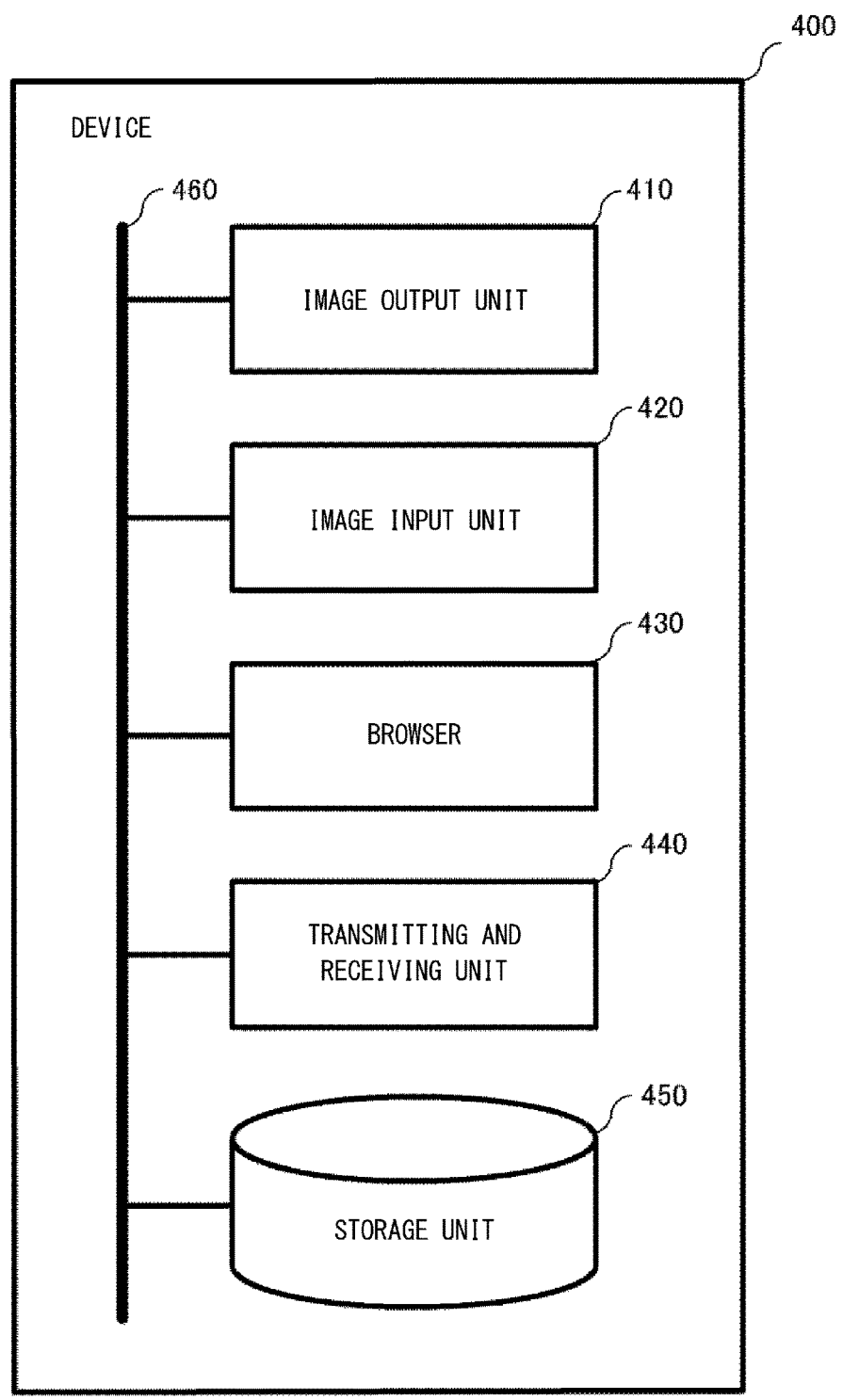
FIG. 3 is a view showing a configuration example of a device according to the embodiment of the present invention.

Referring to FIG. 3, the device 400 includes an image output unit 410, an image input unit 420, a browser 430, a transmitting and receiving unit 440 and a storage unit 450, and they can communicate with one another through a bus 460. The image output unit 410 is an element that outputs an image to another device. The image input unit 420 is an element that receives an image from another device. The browser 430 has the WebRTC function and the function of displaying a received image and acquiring a screen image in which a display area is specified. The transmitting and receiving unit 440 is an element that receives a Web application transmitted from the application server 200, and also transmits a message to the application server 200. The storage unit 450 is an element that stores a Web application or the like transmitted from the application server 200. Further, the device 400 may store a native application having the function of displaying a received image and acquiring a screen image in which a display area is specified into the storage unit 450, instead of including the browser 430.

<Operation of Invention>

Figure 8:
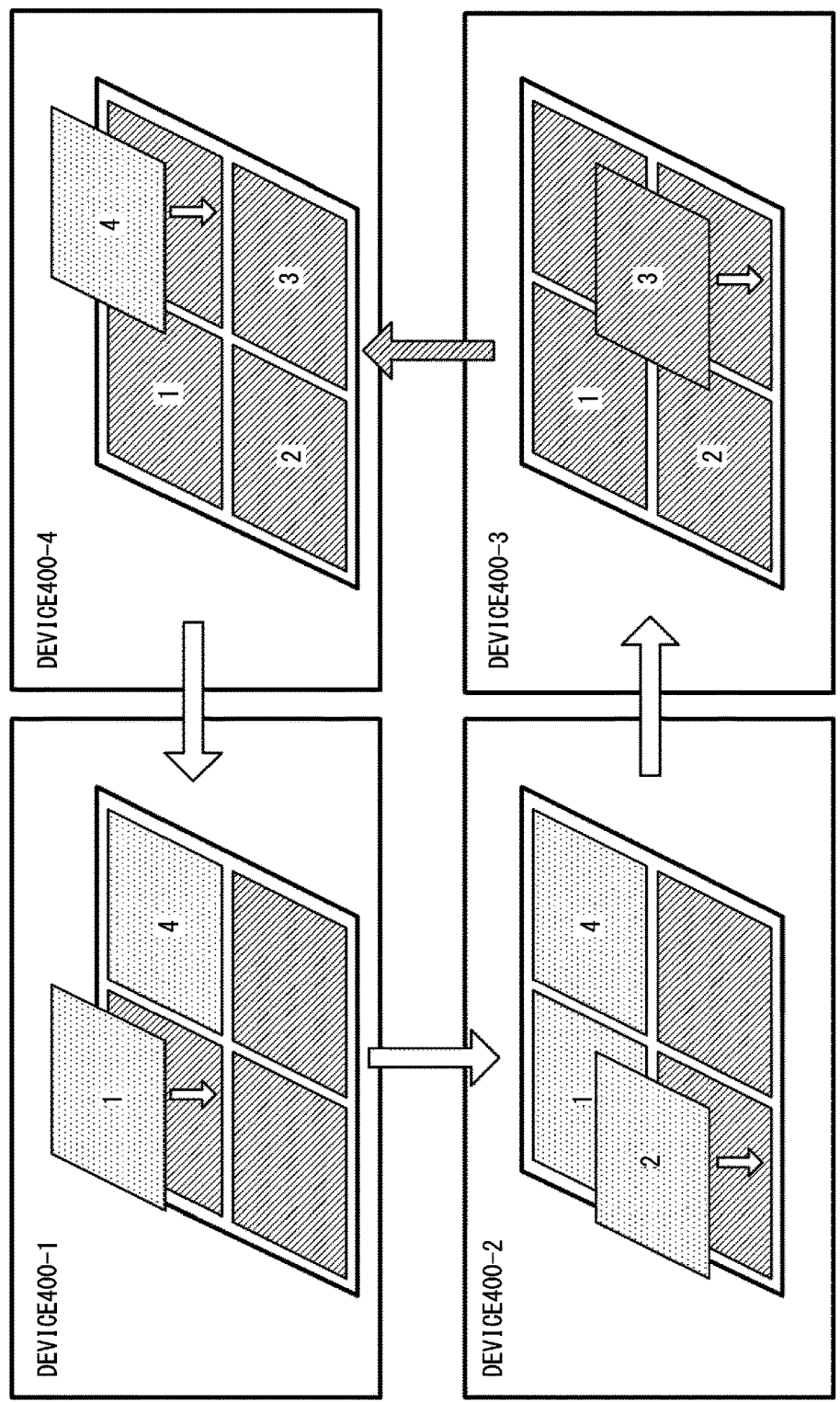
FIG. 8 is a transition diagram in an image transmission and reception flow of the video conference system according to the embodiment of the present invention.

The operation according to an embodiment of the present invention is described hereinafter in detail with reference to the screen layout and the management array in FIGS. 4, 7 and 11, the flowcharts in FIGS. 5 and 9, and the transition diagrams of image transmission and reception in FIGS. 6, 8 and 10. The case where the devices 400-1 to 400-4 hold a video conference is described hereinafter as an example.

Figure 4:
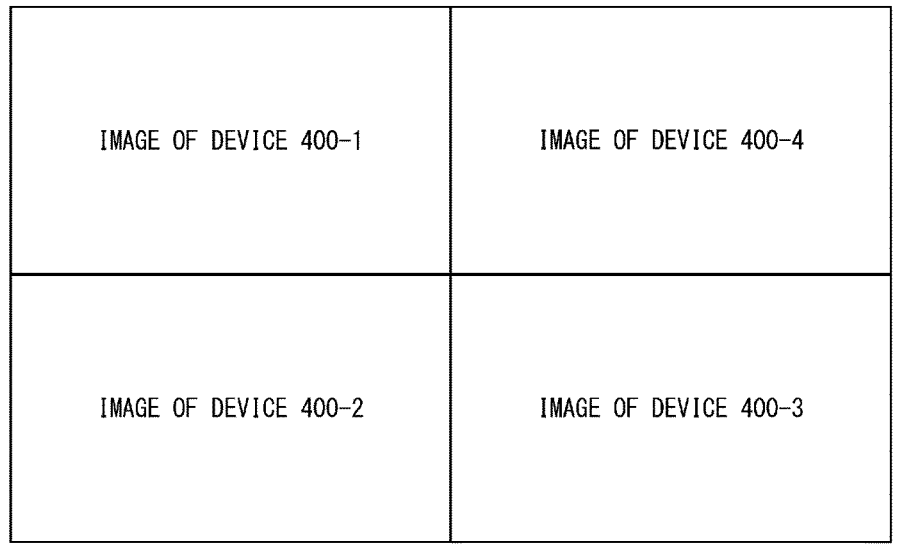
FIG. 4 is a view showing an example of a screen layout and information of a device management array storing a transmission and reception flow defined by the application server according to the embodiment of the present invention.
Figure 5A:
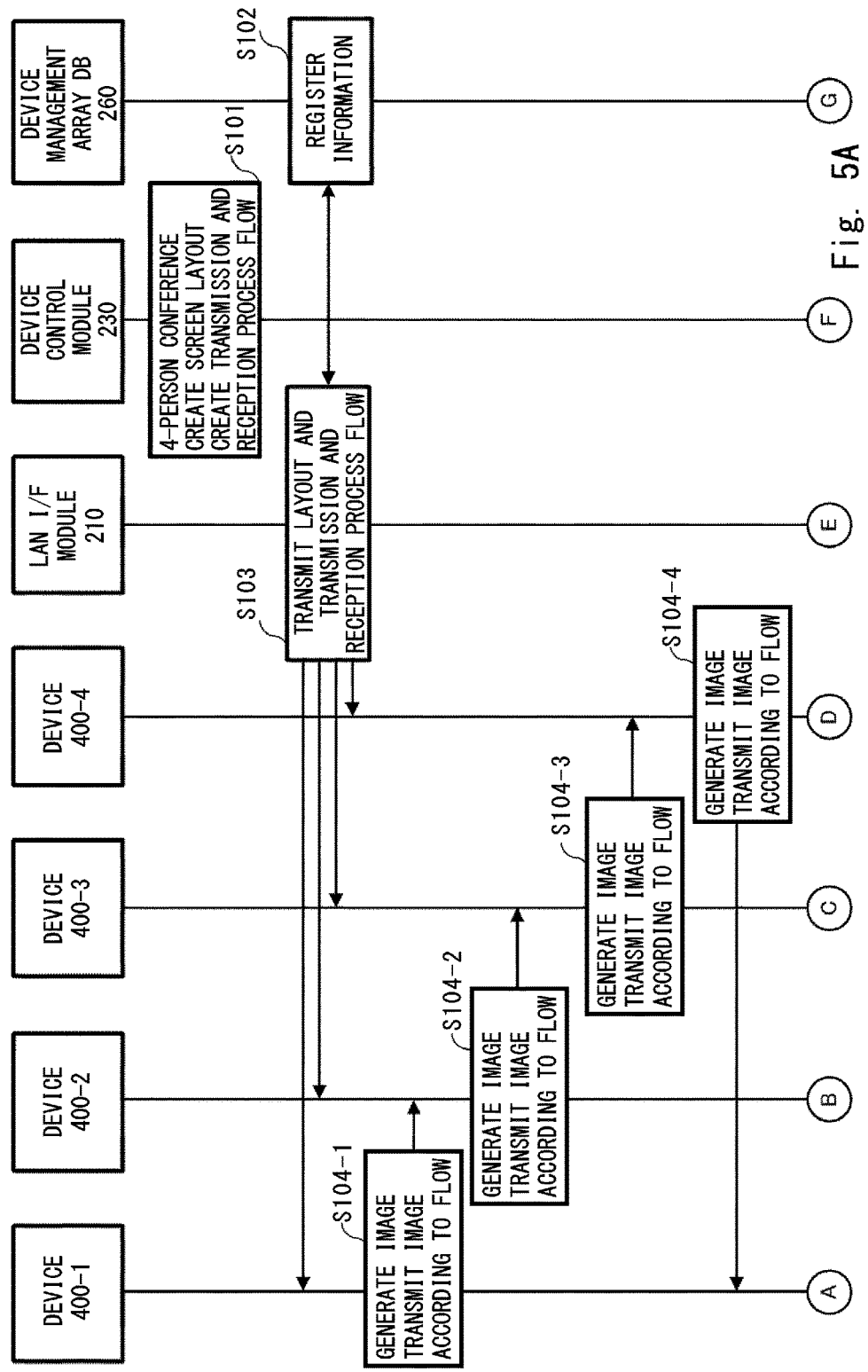
FIG. 5A is a flowchart showing an operational flow of the video conference system according to the embodiment of the present invention.

First, the application server 200 determines, in the device control module 230, the screen layout and the transmission and reception flow for a 4-person conference shown in FIG. 4 (Step S101 in FIG. 5A) and registers them as conference management information into the device management array database 260 (Step S102 in FIG. 5A). Specifically, it is assumed that an image of the device 400-1 is displayed in the upper left field of the screen, an image of the device 400-2 is displayed in the lower left field of the screen, an image of the device 400-3 is displayed in the lower right field of the screen, and an image of the device 400-4 is displayed in the upper right field of the screen as shown in FIG. 4, for example. Further, it is assumed that the device 400-1 receives a base layer from the device 400-4, superimposes an image generated by itself onto the base layer, and transmits this composite image as the base layer to the device 400-2. The device 400-2 receives the base layer from the device 400-1, superimposes an image generated by itself onto the base layer, and transmits this composite image as the base layer to the device 400-3. The device 400-3 receives the base layer from the device 400-2, superimposes an image generated by itself onto the base layer, and transmits this composite image as the base layer to the device 400-4. The device 400-4 receives the base layer from the device 400-3, superimposes an image generated by itself onto the base layer, and transmits this composite image as the base layer to the device 400-1.

Based on the above conference management information, a device control message is transmitted from the LAN I/F module 210 to each of the devices 400-1 to 400-4 (Step S103 in FIG. 5A).

Upon receiving the device control message, each of the devices 400-1 to 400-4 creates a transmission image based on the screen layout, and transmits a moving image based on the transmission and reception flow. Further, an image received by each device from another device is used as a base layer for creation of a transmission image (Steps S104-1 to S104-4 in FIG. 5A).

Figure 6:
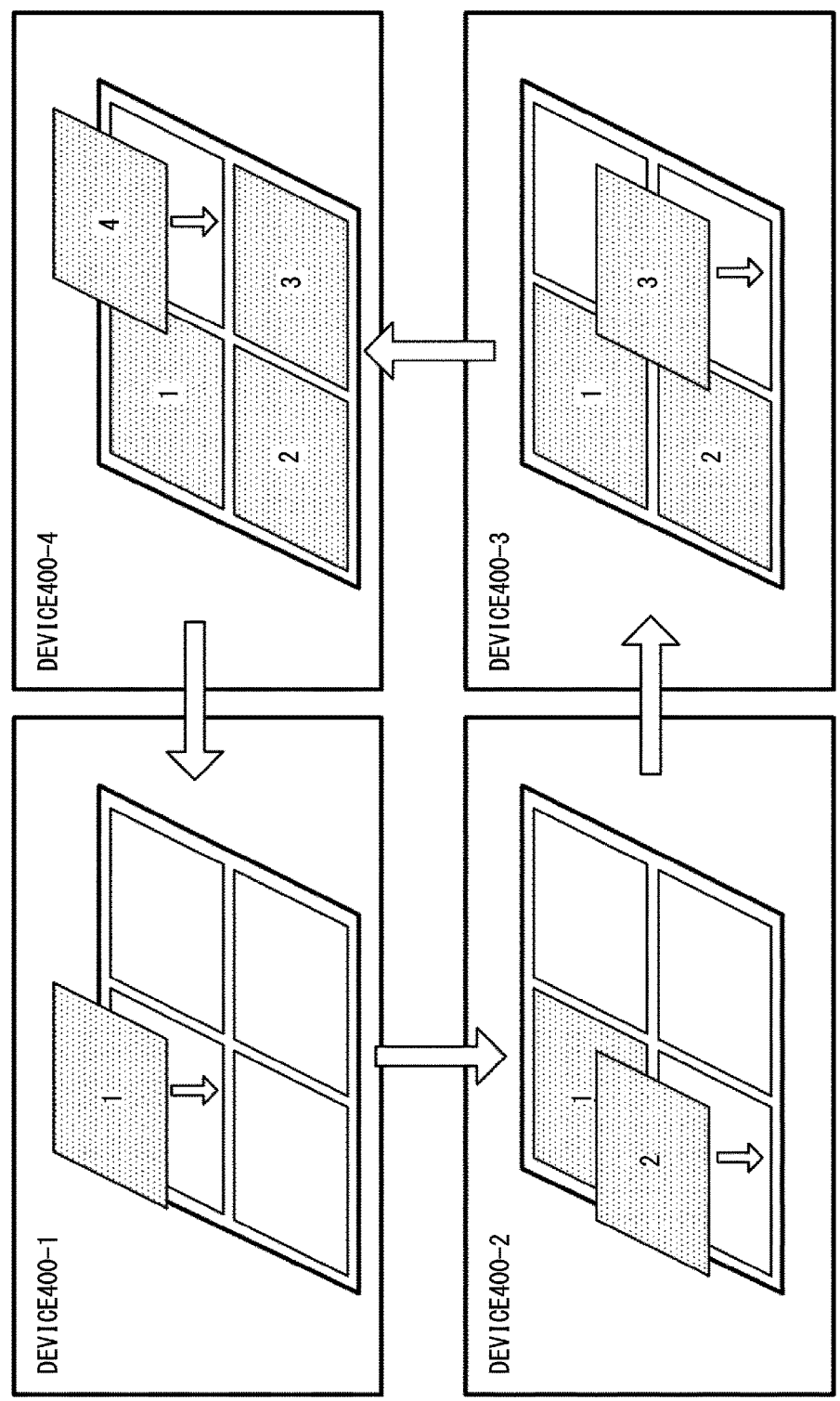
FIG. 6 is a transition diagram in an image transmission and reception flow of the video conference system according to the embodiment of the present invention.

FIG. 6 shows the transition of images at this point in time. There is no image in a base layer because the device 400-1 has not received an image from another device, and the device 400-1 places an image generated by the device 400-1 at the upper left position in an upper layer of the base layer, and transmits this image to the device 400-2. Using the image received from the device 400-1 as the base layer, the device 400-2 places an image generated by the device 400-2 at the lower left position in the upper layer of the base layer, and transmits this image to the device 400-3. Using the image received from the device 400-2 as the base layer, the device 400-3 places an image generated by the device 400-3 at the lower right position in the upper layer of the base layer, and transmits this image to the device 400-4. Using the image received from the device 400-3 as the base layer, the device 400-4 places an image generated by the device 400-4 at the upper right position in the upper layer of the base layer, and transmits this image to the device 400-1. At this point in time, the image received by the device 400-1 from the device 400-4 is an image containing the images generated by the devices 400-1 to 400-4. When the image received by the device 400-1 is reproduced as the base layer, the image of the base layer of the device 400-2 and the device 400-3 also becomes an image containing the images of the devices 400-1 to 400-4. In this manner, a 4-person video conference is implemented as a result of each of the devices 400 carrying out peer-to-peer communication, each for transmission and reception.

FIG. 7 shows the transition of information of a device management array at this point in time. First, as shown in Table (A), each of the devices 400 does not receive an image from another device, and only generates an image by itself. Each of the devices 400 transmits the generated image as the base layer to a device indicated in the field of "destination" in Table (A). The image generated by itself and the transmission quality of the image are all "good".

Next, as shown in Table (B), each of the devices 400 receives a screen image as the base layer from a device located in the previous stage in the transmission and reception flow. For example, the device 400-1 receives a screen image as the base layer from the device 400-4. The quality of the original "image 4" received from the device 400-4 is "good" as shown in the "image 4" field in the row of the device 400-4 in Table (A). Further, because the reception quality of "image 4" is also "good" as shown in the "reception quality" field in the row of the device 400-1 in Table (B), the "image 4" field in the row of the device 400-1 in Table (B) is also "good". The device 400-1 superimposes the good quality "image 1" generated by itself onto the upper layer of the base layer received from the device 400-4, and transmits it to the device 400-2.

Then, as shown in Table (C), each of the devices 400 further receives a screen image as the base layer from a device in the previous stage in the transmission and reception flow, where the received base layers are those shown in Table (B). Specifically, the device 400-1 receives the base layer from the device 400-4, where the base layer received from the device 400-4 is the screen image shown in the row of the device 400-4 in Table (B), which is the screen image where the quality of "image 3" and "image 4" is "good". The device 400-1 superimposes the good quality "image 1" generated by itself onto the upper layer of this base layer. In the row of the device 400-1 in Table (C), the quality of "image 1" generated and superimposed on the base layer by itself is "good", in addition to "image 3" and "image 4".

Finally, as shown in Table (D), all fields of "image 1" to "image 4" are filled out in all rows of the devices 400, and the quality is all "good". This is because the device 400-1, for example, receives the screen image where the quality of "image 2", "image 3" and "image 4" is "good" which is shown in the row of the device 400-4 in Table (C) as the base layer from the device 400-4, and superimposes the good quality "image 1" generated by itself onto the base layer, just like in the transition from Table (B) to Table (C).

Figure 5B:
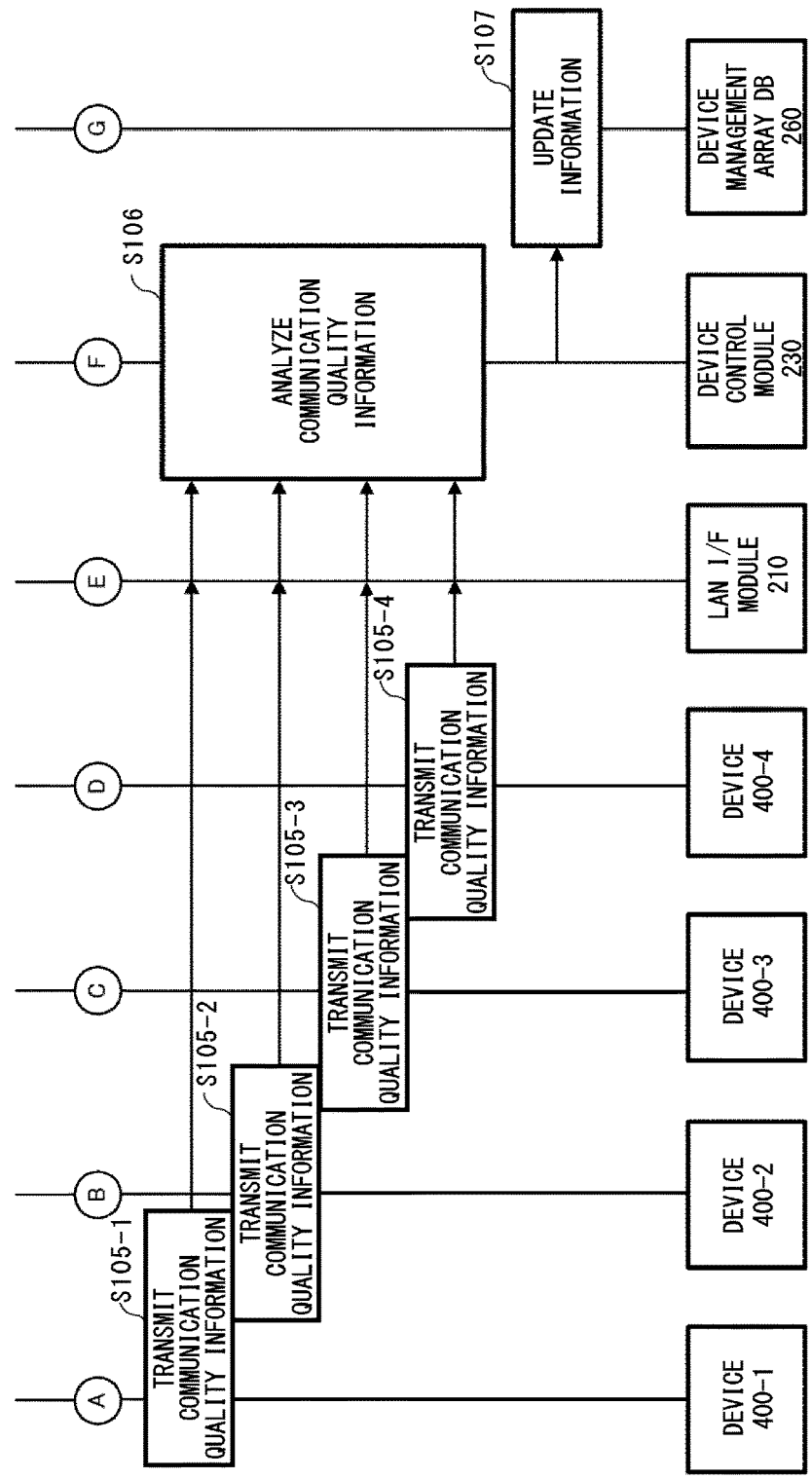
FIG. 5B is a flowchart showing an operational flow of the video conference system according to the embodiment of the present invention.

Referring back to FIG. 5, when there is a change in communication state, each of the devices 400 acquires communication quality information concerning transmission and reception of themselves and transmits this information to the application server 200 (Step S105-1 to S105-4 in FIG. 5B).

When the application server 200 receives the communication quality information, the device control module 230 analyzes this information (Step S106 in FIG. 5B) and updates the quality information of the image displayed by each device (Step S107 in FIG. 5B).

Because an image of the base layer goes through a plurality of devices, if the quality of the image is lowered during its way, the quality remains low in the subsequent devices. The transition of images in the transmission and reception flow in this case is shown in FIG. 8 as an example where the quality of an image in the device 400-3 is degraded. As a result that the quality of images corresponding to all devices is degraded in the device 400-3, the quality of the images corresponding to all devices in the base layer transmitted from the device 400-3 to the device 400-4 is also degraded.

On the base layer where the quality of the images corresponding to all devices is lowered, the device 400-4 superimposes a good quality image generated by the device 400-4 itself at the upper right position in an upper layer of the base layer. The device 400-4 transmits the screen image where only the image at the upper right position has good quality as the base layer to the device 400-1.

On the base layer received from the device 400-4 where only the image at the upper right position has good quality, the device 400-1 superimposes a good quality image generated by the device 400-1 itself at the upper left position in the upper layer of the base layer. The device 400-1 transmits the screen image where only the images at the upper right and upper left positions have good quality as the base layer to the device 400-2.

On the base layer received from the device 400-1 where only the images at the upper right and upper left positions have good quality, the device 400-2 superimposes a good quality image generated by the device 400-2 itself at the lower left position in the upper layer of the base layer.

As described above, although only the image generated by the device 400-3 has low quality among the images generated by the devices 400-1 to 400-4, the images corresponding to the other devices are also degraded in the screen image of the device 400-1, the device 400-3 and the device 400-4. In view of this, the video conference system 100 performs the operation according to the flowcharts of FIGS. 9A and 9B.

Figure 9A:
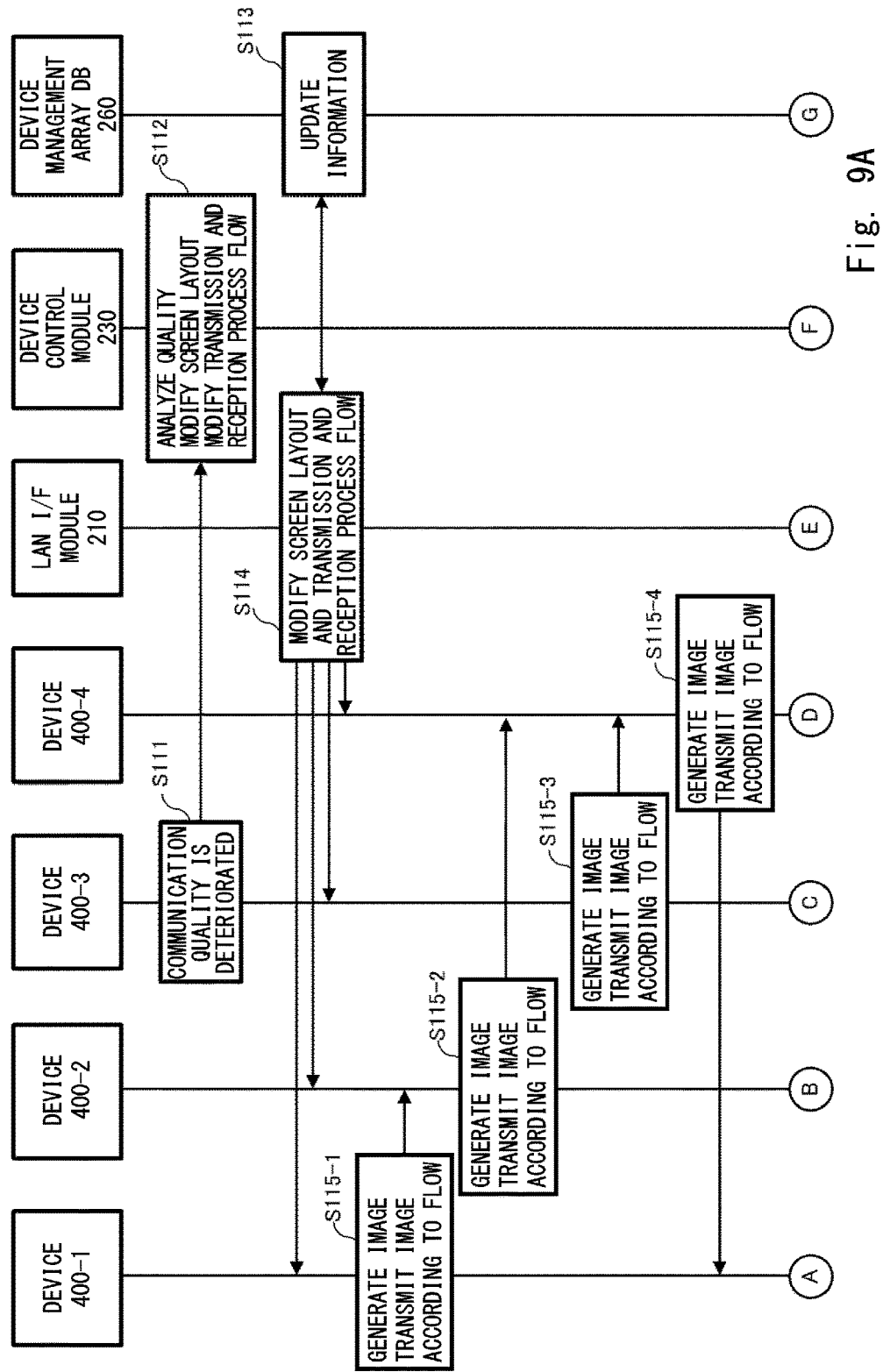
FIG. 9A is a flowchart showing an operational flow of the video conference system according to the embodiment of the present invention.

The device 400-3, whose communication state has changed as described above, transmits information indicating degradation of communication quality to the application server (Step S111 in FIG. 9A).

The device control module 230 receives the information indicating degradation of communication quality, and detects the degradation of communication quality. The device control module 230 then make a modification to the communication path so that only the image generated by itself is transmitted from the device 400-3 with the degraded communication state to the device 400-4 with the good communication state, and the base layer image is transmitted from the device 400-2 with the good communication state to the device 400-4 with the good communication state and from the device 400-4 with the good communication state to the device 400-3 with the degraded communication state (Step S112 in FIG. 9A). Further, the device control module 230 updates communication state information in the device management array (Step S113 in FIG. 9A), and gives a notification about this to each device (Step S114 in FIG. 9A).

Each device receives a modification of the transmission and reception flow, and modifies the operation according to the instruction (Step S115-1 to S115-4 in FIG. 9A). Specifically, the device 400-2 transmits the image generated by itself to the device 400-4, not the device 400-3, differently from the flow shown in FIG. 5A.

Figure 10:
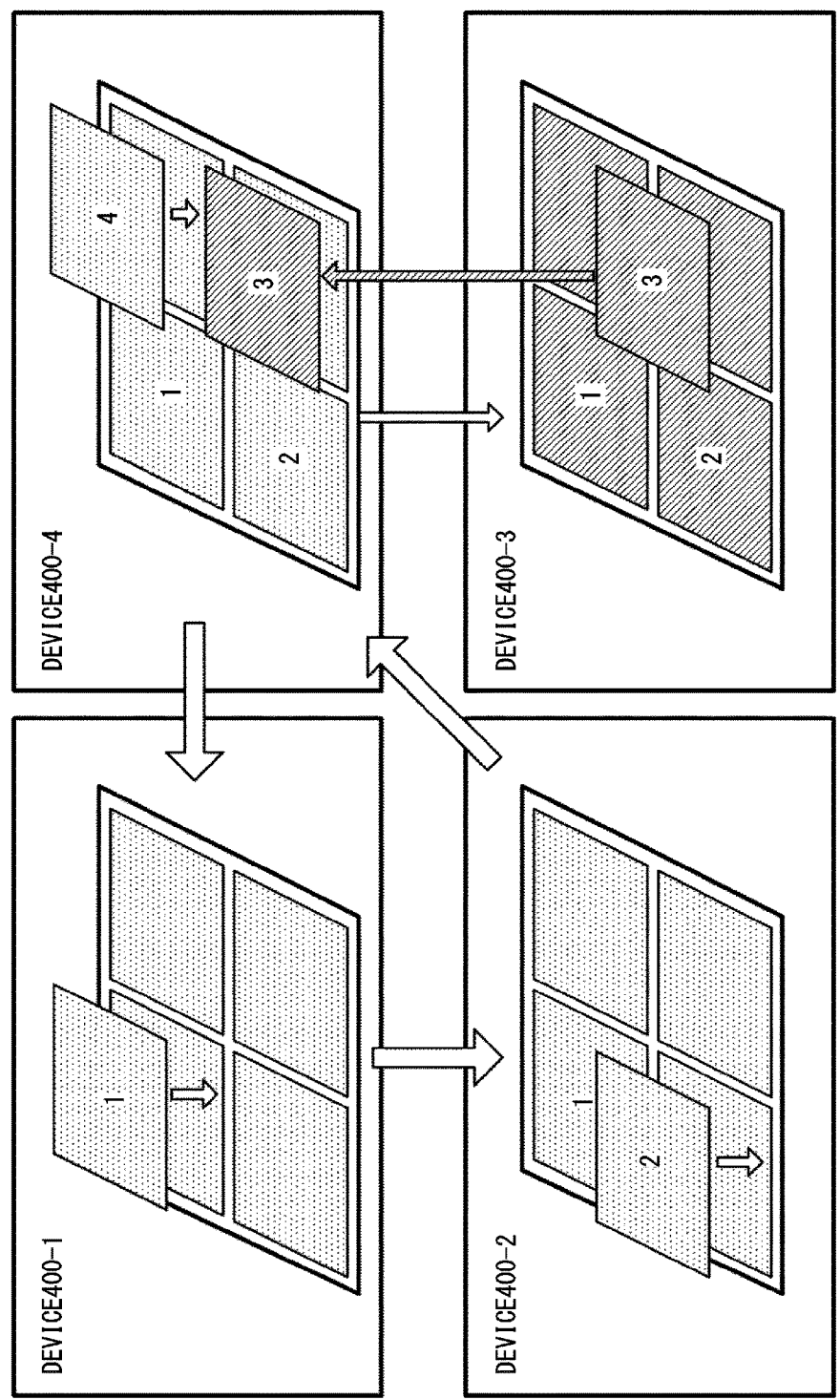
FIG. 10 is a transition diagram in an image transmission and reception flow of the video conference system according to the embodiment of the present invention.

FIG. 10 shows the transition of images in the image transmission and reception flow after modification of the path. The loop of receiving the base layer from a previous device, superimposing the image of itself onto the received base layer, and transmitting the screen image where the image of itself is superimposed as the base layer to a subsequent device is closed among the three devices: the device 400-1, the device 400-2 and the device 400-4. The device 400-3 transmits only the image generated by itself to the device 400-4, and the device 400-4 transmits the screen image of itself as the base layer to the device 400-3. The device 400-4 thereby maintains the quality of the base layer.

FIG. 11 shows the transition of information of the device management array at this point in time. FIG. 11(A) shows the quality of a screen image of each device in FIG. 8, and the communication path is modified before and after the transition from FIG. 11(A) to FIG. 11(B). By the modification of the communication path, the image quality of the base layer of the device 400-4 is recovered, and the image quality of the base layer of the device 400-1 is also recovered.

Figure 9B:
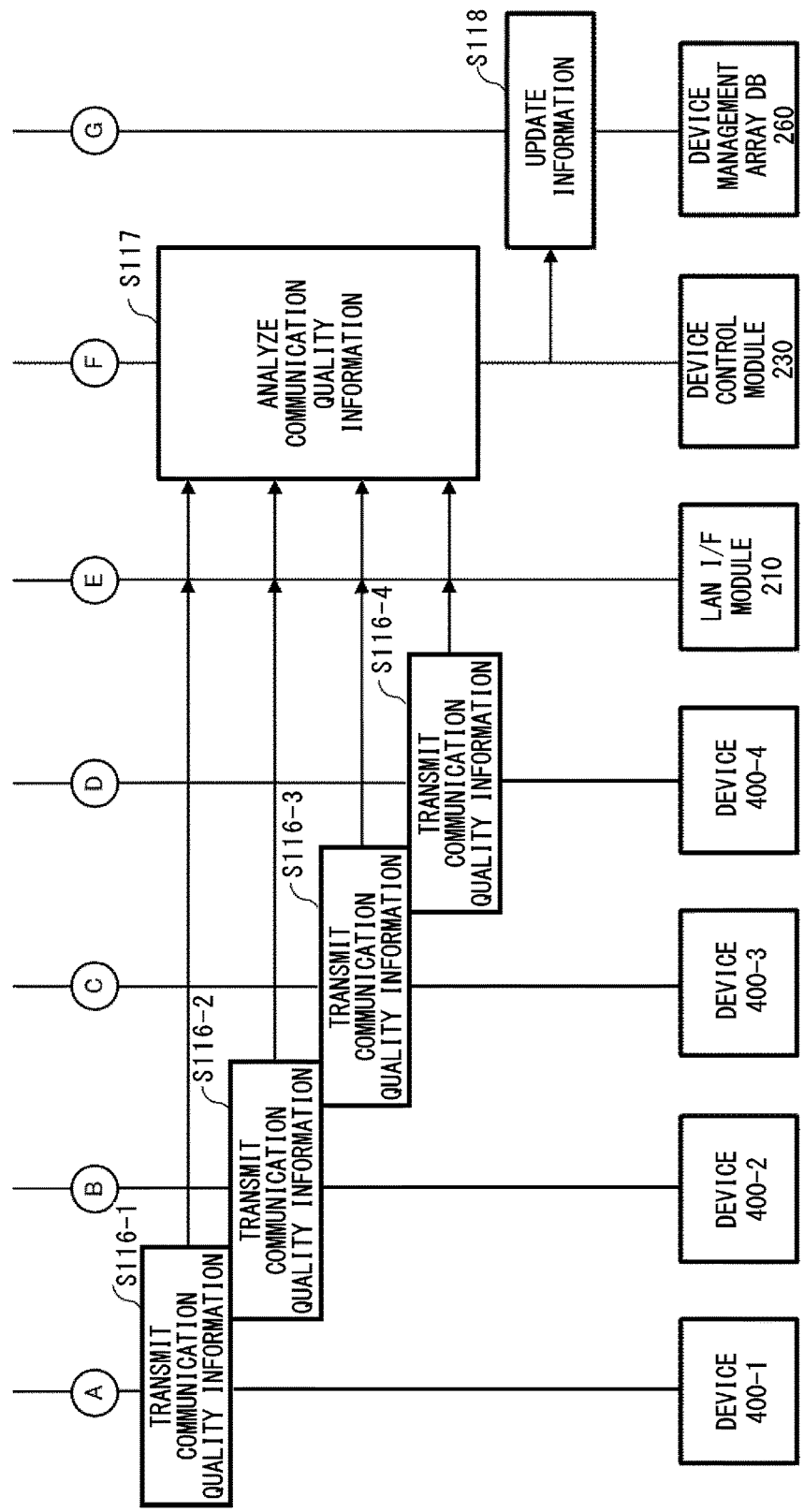
FIG. 9B is a flowchart showing an operational flow of the video conference system according to the embodiment of the present invention.

Referring back to FIG. 9, the device 400 whose communication quality state has changed notifies the application server 200 of the communication quality information (Step S116-1 to S116-4 in FIG. 9B).

When the application server 200 receives the communication quality information, the device control module 230 analyzes the communication quality information and thereby detects the recovery of communication (Step S117 in FIG. 9B), and updates the communication state information in the device management array (Step S118 in FIG. 9B).

According to the embodiment of the present invention, because each device transmits a screen image where an image generated by itself is superimposed on a received image based on the screen layout indicated by a server, media communication required in each device is peer-to-peer, one each for transmission and reception, regardless of the number of participants in a video conference, It is thereby possible to achieve decentralization of the communication bandwidth and reduction of the processing load when transmitting all images of participating devices to all of the participating devices. The embodiment of the present invention is particularly effective in the case where the network bandwidth is narrow, the CPU processing performance is low, and there are many participants.

Other Examples

Although the number of devices that participate in a conference is four in the above description, it is scalable to an arbitrary number N of devices.

The Web server module 220, the device control module 230 and the signaling server module 240 included in the application server 200 are not necessarily in one hardware, and they may exist separately.

Further, the devices 400-1 to 400-4 do not necessarily transmit an image generated by themselves. In this case, devices other than a device that does not transmit an image generated by itself can carry out transmission and reception, and the device that does not transmit an image generated by itself can only carry out reception from any one of those devices. The transmission and reception flow is managed in the device control module 230 of the application server 200, and transmitted as a control message to each of the devices 400-1 to 400-4.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

Note that each component of the video conference system, the application server and the device can be implemented by hardware, software, or a combination of them. Further, a video conference method performed by the above-described video conference system, the application server and the device can be also implemented by hardware, software, or a combination of them. "Implemented by software" means that it is implemented as a result that a computer reads and executes a program, or hardware operates according to microcode, which corresponds to a program.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, the whole or part of the embodiments disclosed above can be described as, but not limited to, the following supplementary notes.

Supplementary Note 1

A video conference system comprising:

an application server; and a plurality of devices configured to be connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices, and at least one device of the plurality of devices transmits a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow.

Supplementary Note 2

The video conference system according to Supplementary Note 1, wherein when a change occurs in communication state, the at least one device acquires communication quality information concerning transmission and reception of the at least one device and transmits the communication quality information to the application server, and the application server receives the communication quality information, analyzes the communication quality information, and updates quality of an image displayed by the at least one device.

Supplementary Note 3

The video conference system according to Supplementary Note 2, wherein, when the application server receives the communication quality information indicating degradation of communication quality from the at least one device, the at least one device transmits only an image generated by the at least one device to a device subsequent to the at least one device.

Supplementary Note 4

The video conference system according to Supplementary Note 3, wherein the at least one device receives an image serving as the base layer from a device subsequent to the at least one device.

Supplementary Note 5

The video conference system according to Supplementary Note 3 or 4, wherein a device subsequent to the at least one device receives an image serving as the base layer from a device previous to the at least one device.

Supplementary Note 6

The video conference system according to any one of Supplementary Notes 1 to 5, wherein at least one device of the plurality of devices does not transmit an image generated by the at least one device to another device but receives an image from any one of other devices.

Supplementary Note 7

An application server used in a video conference system including the application server and a plurality of devices that are connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices.

Supplementary Note 8

A device used in a video conference system including an application server and a plurality of devices that are connected to the application server through a communication network and receive a Web application from the application server, wherein when the application server determines a screen layout according to the number of participants in a video conference and a media transmission and reception flow going through all devices used by the participants and transmits the screen layout and the media transmission and reception flow to each of the plurality of devices, the device transmits a screen image where an image generated by the device is superimposed in an upper layer of a base layer, the base layer being an image received from a device located previous to the device in the media transmission and reception flow, according to the screen layout received from the application server by using the Web application, to a device located subsequent to the device in the media transmission and reception flow.

Supplementary Note 9

A video conference method used in a video conference system including an application server and a plurality of devices that are connected to the application server through a communication network and receive a Web application from the application server, the method comprising:

determining, by the application server, a screen layout according to the number of participants in a video conference and a media transmission and reception flow going through all devices used by the participants, and transmitting the screen layout and the media transmission and reception flow to each of the plurality of devices, and transmitting, by at least one device of the plurality of devices, a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow.

Supplementary Note 10

The video conference method according to Supplementary Note 9, wherein when a change occurs in communication state, the at least one device acquires communication quality information concerning transmission and reception of the at least one device and transmits the communication quality information to the application server, and the application server receives the communication quality information, analyzes the communication quality information, and updates quality of an image displayed by the at least one device.

Supplementary Note 11

The video conference method according to Supplementary Note 10, wherein, when the application server receives the communication quality information indicating degradation of communication quality from the at least one device, the at least one device transmits only an image generated by the at least one device to a device subsequent to the at least one device.

Supplementary Note 12

The video conference method according to Supplementary Note 11, wherein the at least one device receives an image serving as the base layer from a device subsequent to the at least one device.

Supplementary Note 13

The video conference method according to Supplementary Note 11 or 12, wherein a device subsequent to the at least one device receives an image serving as the base layer from a device previous to the at least one device.

Supplementary Note 14

The video conference method according to any one of Supplementary Notes 9 to 13, wherein at least one device of the plurality of devices does not transmit an image generated by the at least one device to another device but receives an image from any one of other devices.

Supplementary Note 15

A video conference program causing a computer to function as an application server used in a video conference system including the application server and a plurality of devices that are connected to the application server through a communication network and receive a Web application from the application server, wherein the application server determines a screen layout according to the number of participants in a video conference and a media transmission and reception flow going through all devices used by the participants, and transmits the screen layout and the media transmission and reception flow to each of the plurality of devices.

Supplementary Note 16

A video conference program causing a computer to function as a device used in a video conference system including an application server and a plurality of devices that are connected to the application server through a communication network and receive a Web application from the application server, wherein when the application server determines a screen layout according to the number of participants in a video conference and a media transmission and reception flow going through all devices used by the participants and transmits the screen layout and the media transmission and reception flow to each of the plurality of devices, the device transmits a screen image where an image generated by the device is superimposed in an upper layer of a base layer, the base layer being an image received from a device located previous to the device in the media transmission and reception flow, according to the screen layout received from the application server by using the Web application, to a device located subsequent to the device in the media transmission and reception flow.

INDUSTRIAL APPLICABILITY

The present invention is applicable to a video conference system. Besides, the present invention is applicable to peer-to-peer communication that is two-way and among many devices, without any restrictions on the content of data.

REFERENCE SIGNS LIST

100 VIDEO CONFERENCE SYSTEM
200 APPLICATION SERVER
210 LAN I/F MODULE
220 WEB SERVER MODULE
230 DEVICE CONTROL MODULE
240 SIGNALING SERVER MODULE
250 WEB CONTENT DATABASE
260 DEVICE MANAGEMENT ARRAY DATABASE
300 COMMUNICATION NETWORK
400, 400-1, 400-2, 400-3, 400-4 DEVICE
410 IMAGE OUTPUT UNIT
420 IMAGE INPUT UNIT
430 BROWSER
440 TRANSMITTING AND RECEIVING UNIT
450 STORAGE UNIT
460 BUS

The invention claimed is:

1. A video conference system comprising:
an application server; and
a plurality of devices configured to be connected to the application server through a communication network and receive a Web application from the application server, wherein
the application server determines a screen layout according to the number of participants in a video conference and a media transmission and reception flow going through all devices used by the participants, and transmits the screen layout and the media transmission and reception flow to each of the plurality of devices,
at least one device of the plurality of devices transmits a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow, when a change occurs in communication state, acquires communication quality information concerning transmission and reception of the at least one device, and transmits the communication quality information to the application server,
the application server receives the communication quality information, analyzes the communication quality information, and updates quality of an image displayed by the at least one device,
when the application server receives the communication quality information indicating degradation of communication quality from the at least one device, the application server makes a modification to the media transmission and reception flow so that only the image generated by the at least one device is transmitted from the at least one device to the device located subsequent to the at least one device, and an image serving as the base layer is transmitted from the device located previous to the at least one device to the device located subsequent to the at least one device and from the device located subsequent to the at least one device to the at least one device, and transmits the modified media transmission and reception flow to each of the plurality of devices,
the device subsequent to the at least one device receives the image serving as the base layer from the device previous to the at least one device, and
the at least one device transmits only the image generated by the at least one device to the device located subsequent to the at least one device, and receives the image serving as the base layer from the device subsequent to the at least one device.

2. The video conference system according to claim 1, wherein at least one device of the plurality of devices does not transmit an image generated by the at least one device to another device but receives an image from any one of other devices.

3. A video conference method used in a video conference system including an application server and a plurality of devices that are connected to the application server through a communication network and receive a Web application from the application server, the method comprising:
determining, by the application server, a screen layout according to the number of participants in a video conference and a media transmission and reception flow going through all devices used by the participants, and transmitting the screen layout and the media transmission and reception flow to each of the plurality of devices, and
transmitting, by at least one device of the plurality of devices, a screen image where an image generated by the at least one device is superimposed in an upper layer of a base layer, the base layer being an image received from a device located previous to the at least one device in the media transmission and reception flow, according to the screen layout received from the application server by using the Web application, to a device located subsequent to the at least one device in the media transmission and reception flow, when a change occurs in communication state, acquiring communication quality information concerning transmission and reception of the at least one device, and transmitting the communication quality information to the application server,
receiving, by the application server, the communication quality information, analyzing the communication quality information, and updating quality of an image displayed by the at least one device,
when the application server receives the communication quality information indicating degradation of communication quality from the at least one device, making, by the application server, a modification to the media transmission and reception flow so that only the image generated by the at least one device is transmitted from the at least one device to the device located subsequent to the at least one device, and an image serving as the base layer is transmitted from the device located previous to the at least one device to the device located subsequent to the at least one device and from the device located subsequent to the at least one device to the at least one device, and transmitting the modified media transmission and reception flow to each of the plurality of devices,
receiving, by the device subsequent to the at least one device, the image serving as the base layer from the device previous to the at least one device, and
transmitting, by the at least one device, only the image generated by the at least one device to the device located subsequent to the at least one device, and receiving the image serving as the base layer from the device subsequent to the at least one device.

4. The video conference method according to claim 3, wherein at least one device of the plurality of devices does not transmit an image generated by the at least one device to another device but receives an image from any one of other devices.

* * * * *